(12) United States Patent
Norris et al.

(10) Patent No.: US 8,096,753 B2
(45) Date of Patent: Jan. 17, 2012

(54) TIP TURBINE ENGINE AND OPERATING METHOD WITH REVERSE CORE AIRFLOW

(75) Inventors: James W. Norris, Lebanon, CT (US); Craig A. Nordeen, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1248 days.

(21) Appl. No.: 11/719,587

(22) PCT Filed: Dec. 1, 2004

(86) PCT No.: PCT/US2004/040067
§ 371 (c)(1),
(2), (4) Date: May 17, 2007

(87) PCT Pub. No.: WO2006/059986
PCT Pub. Date: Jun. 8, 2006

(65) Prior Publication Data
US 2009/0148272 A1    Jun. 11, 2009

(51) Int. Cl.
*F01D 15/12* (2006.01)
(52) U.S. Cl. .................... 415/122.1; 60/226.1
(58) Field of Classification Search .......... 60/39.43, 60/39.162, 226.1, 268; 415/211.2, 122.1, 415/66, 68, 62, 69, 199.6; 416/124, 126, 416/128, 170 R, 198 A, 198 R, 203
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A * | 11/1961 | Busquet ................. 415/58.7 |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |

(Continued)

FOREIGN PATENT DOCUMENTS

| | | |
|---|---|---|
| DE | 767704 | 5/1953 |
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |

(Continued)

*Primary Examiner* — Edward Look
*Assistant Examiner* — Ryan Ellis
(74) *Attorney, Agent, or Firm* — Carlson, Gaskey & Olds, P.C.

(57) ABSTRACT

A tip turbine engine (10) and a method of operating the engine provides increased efficiency while eliminating or educing the number of axial compressor (122) stages by moving the core airflow inlet (27) aft of the fan (24). As a result, the core airflow entering the core airflow inlet is the fan exhaust, which is already at an increased pressure. A portion of the fan exhaust is guided radially inward, then axially forward and then radially outward through compressor chambers (72) in the hollow fan blades (28) for further, centrifugal compression.

21 Claims, 3 Drawing Sheets

U.S. PATENT DOCUMENTS

| | | | |
|---|---|---|---|
| 3,267,667 A | 8/1966 | Erwin | |
| 3,269,120 A | 8/1966 | Sabatiuk | |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A * | 2/1981 | Adamson | 60/805 |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A | 11/1995 | McKibbin et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Lifson et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,883,303 B1 | 4/2005 | Seda | |
| 6,910,854 B2 | 6/2005 | Joslin | |
| 6,966,174 B2 * | 11/2005 | Paul | 60/226.1 |
| 7,021,042 B2 | 4/2006 | Law | |
| 7,214,157 B2 | 5/2007 | Flamang et al. | |
| 7,726,113 B2 * | 6/2010 | Orlando et al. | 60/39.162 |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 | 10/2003 | Paul | |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |

FOREIGN PATENT DOCUMENTS

| | | |
|---|---|---|
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |
| GB | 2026102 | 1/1980 |
| GB | 2095755 | 10/1982 |
| GB | 2191606 | 12/1987 |
| GB | 2229230 | 9/1990 |
| GB | 2265221 | 9/1993 |
| GB | 2401655 | 11/2004 |
| GB | 2410530 | 8/2005 |
| JP | 10184305 | 7/1998 |
| WO | 9902864 | 1/1999 |
| WO | 0127534 | 4/2001 |
| WO | 02081883 | 10/2002 |
| WO | 2004011788 | 2/2004 |
| WO | 2004022948 | 3/2004 |
| WO | 2004092567 | 10/2004 |
| WO | 2006059980 | 6/2006 |
| WO | 2006059986 | 6/2006 |
| WO | 2006059987 | 6/2006 |
| WO | 2006059990 | 6/2006 |
| WO | 2006059993 | 6/2006 |
| WO | 2006060003 | 6/2006 |
| WO | 2006112807 | 12/2006 |
| WO | 2006110125 | 2/2007 |

* cited by examiner

TIP TURBINE ENGINE AND OPERATING METHOD WITH REVERSE CORE AIRFLOW

BACKGROUND OF THE INVENTION

The present invention relates to a tip turbine engine, and more particularly to a tip turbine engine with a core airflow inlet aft of a bypass fan.

An aircraft gas turbine engine of the conventional turbofan type generally includes a forward bypass fan, a low pressure compressor, a high pressure compressor, a combustor, a high pressure turbine, and a low pressure turbine, all located along a common longitudinal axis. The low and high pressure compressors are rotatably driven to compress entering air to a relatively high pressure. This high pressure air is then mixed with fuel in the combustor, where it is ignited to form a high energy gas stream. This gas stream flows axially aft to rotatably drive the high pressure turbine, which rotatably drives the high pressure compressor via a high spool shaft. The gas stream leaving the high pressure turbine is expanded through the low pressure turbine, which rotatably drives the forward bypass fan and the low pressure compressor via a low spool shaft.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines include hollow fan blades through which core airflow flows, such that the hollow fan blades operate as centrifugal compressor chambers. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio at least equivalent to conventional turbofan engines of the same class, but within a package of significantly shorter length.

In some tip turbine engine designs, core airflow may be compressed by an axial compressor before entering the hollow fan blades for further, centrifugal compression. The axial compressor may include an axial compressor rotor with one or more stages of radially-extending compressor blades. Increasing the number of stages of compressor blades increases the compression of the core airflow and the efficiency of the engine, but increases the overall length and weight of the engine and the number of parts.

SUMMARY OF THE INVENTION

A tip turbine engine according to the present invention provides increased efficiency while eliminating or reducing the number of axial compressor stages by moving the core airflow inlet aft of the fan. As a result, the core airflow entering the core airflow inlet is the fan exhaust, which is already compressed by the fan. The fan exhaust is fed axially forward and then radially outward through compressor chambers in the hollow fan blades for further, centrifugal compression.

The tip turbine engine may optionally include an axial compressor between the core airflow inlet and the compressor chambers in the hollow fan blades. However, in contrast to axial compressors that are located forward of a bypass fan, these axial compressors utilize high-pressure fan exhaust, which allows them to have fewer stages therein while still providing the same high pressure core airflow to the compressor chambers in the hollow fan blades.

In one embodiment, the fan of the tip turbine engine drives the axial compressor via at least one gear that increases the rate of rotation of the axial compressor relative to the fan and/or reverses the direction of rotation of the axial compressor relative to the fan.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
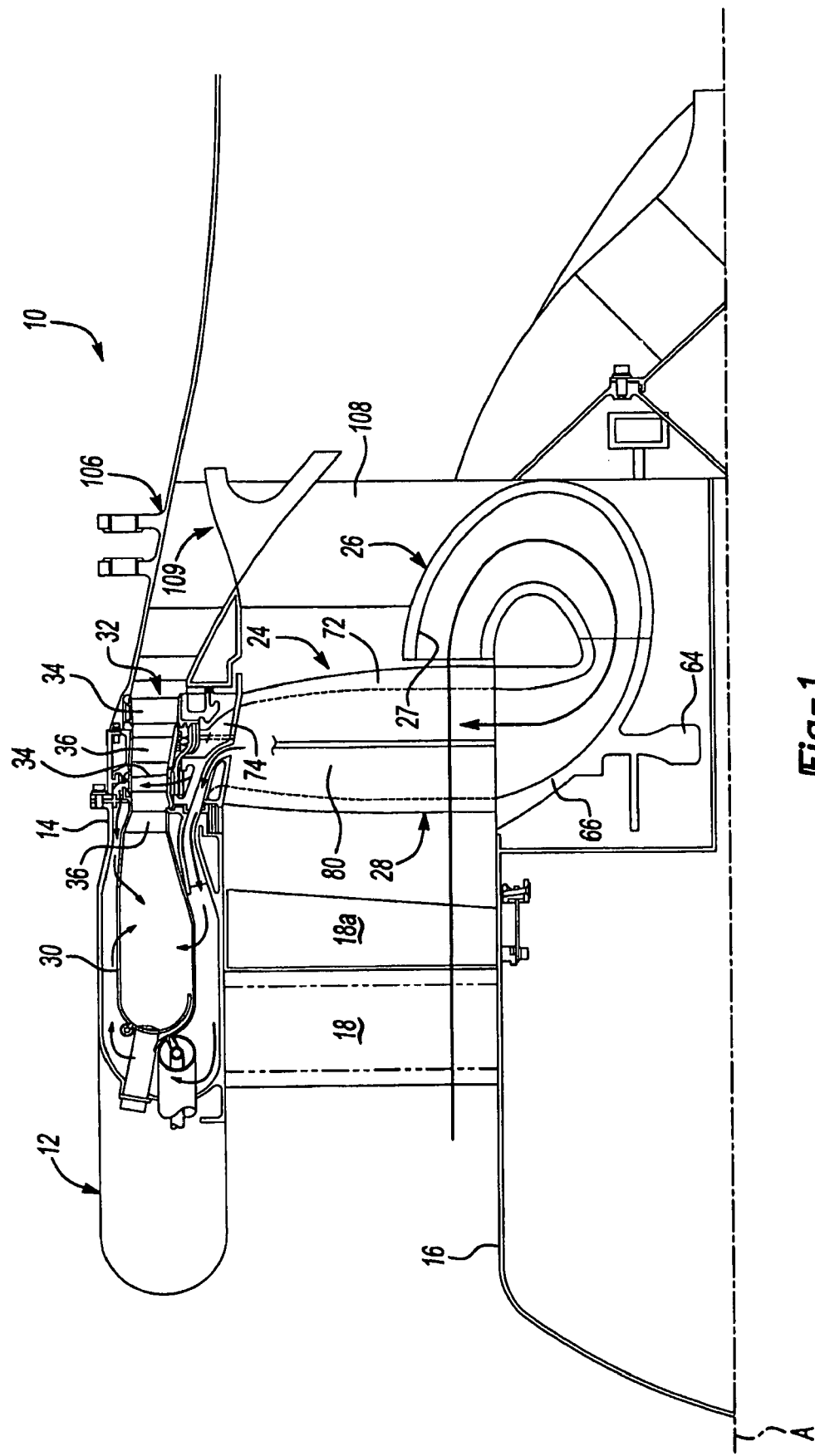
FIG. 1 is a longitudinal sectional view of a first embodiment of a tip turbine engine according to the present invention.

FIG. 1 illustrates a partial sectional view of a tip turbine engine (TTE) type gas turbine engine 10 taken along an engine centerline A. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18a.

A fan-turbine rotor assembly 24 is mounted for rotation about the engine centerline A fore of a core airflow passage 26 having a core airflow inlet 27. The fan-turbine rotor assembly 24 includes a plurality of hollow fan blades 28 to provide internal, centrifugal compression of the compressed airflow for distribution to an annular combustor 30 located within the rotationally fixed static outer support structure 14. The core airflow inlet 27 is aft of the fan blades 28 and leads to the core airflow passage 26, which reverses the core airflow such that it flows back toward the fan-turbine rotor assembly 24 in a direction generally parallel to the engine centerline A.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow traveling generally parallel to the engine centerline A from the core airflow passage 26, and turns the airflow from an axial airflow direction toward a radial airflow direction. The airflow is radially communicated through a core airflow passage 80 within the hollow fan blade section 72, which acts as a compressor chamber where the airflow is centrifugally compressed. From the core airflow passage 80, the airflow is diffused and turned once again toward an axial airflow direction toward the annular combustor 30. Preferably, the airflow is diffused axially forward in the engine 10, however, the airflow may alternatively be communicated in another direction.

In operation, airflow enters the engine 10 and passes between inlet guide vanes 18 and rotating fan blades 28. The rotating fan blades 28 compress the airflow and discharge high-pressure fan exhaust. A portion of the fan exhaust enters the core airflow inlet 27 and is reversed by the core airflow passage 26. The core airflow passage 26 turns the axially rearward flowing fan exhaust radially inwardly and then axially forward toward the inducer section 66. The reversed core airflow enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30, where it is ignited to form a high-energy gas stream. The high-energy gas stream is expanded over the plurality of tip turbine blades 34 mounted about the outer periphery of the fan-turbine rotor assembly 24 to drive the fan-turbine rotor assembly 24. Concurrent therewith, the fan-turbine rotor assembly 24 discharges fan bypass air (fan exhaust) axially aft to merge with the core airflow from the turbine 32 in an exhaust case 106. A plurality of exit guide vanes 108 extend inwardly from the rotationally fixed static outer support structure 14 to guide the combined airflow out of the engine 10 and provide forward thrust. An exhaust mixer 109 mixes the airflow from the turbine blades 34 with the bypass airflow through the fan blades 28.

By feeding back some of the high-pressure fan exhaust as the core airflow, the efficiency of the engine 10 is increased, without the need for an axial compressor. This reduces the overall length and weight of the engine 10 and reduces the number of parts.

Figure 2:
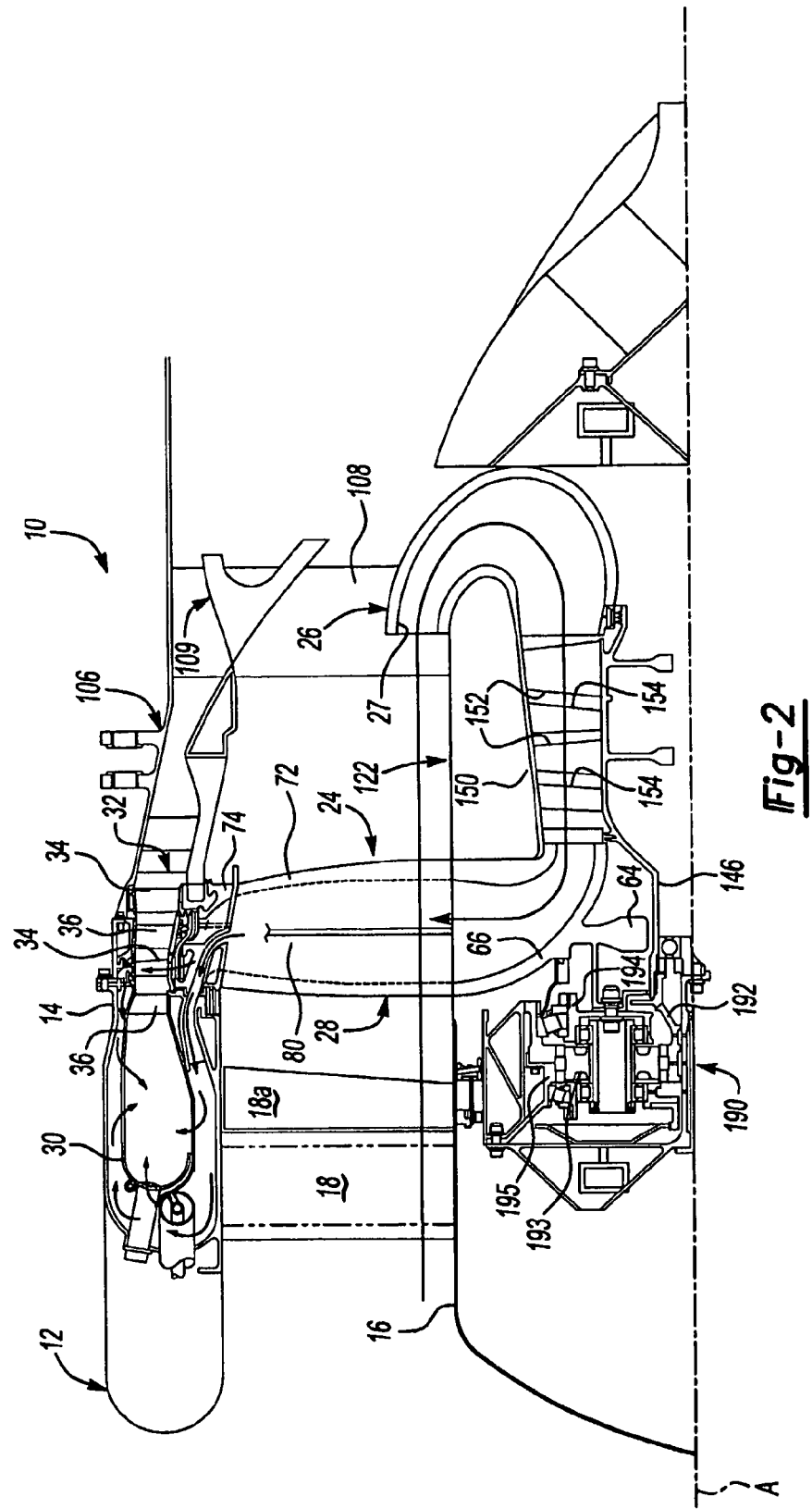
FIG. 2 is a longitudinal sectional view of a second embodiment of a tip turbine engine according to the present invention.

FIG. 2 illustrates a second embodiment of a tip turbine engine 110 according to the present invention which additionally incorporates an axial compressor 122 for even further compression of the core airflow. Components that are similar to those described above with respect to FIG. 1 are indicated with the same reference numeral, and the description of those components and their operation is incorporated by reference here.

The axial compressor 122 is mounted between the core airflow passage 26 and the inducer sections 66. The axial compressor 122 includes an axial compressor rotor 146, from which a plurality of compressor blades 152 extend radially outwardly, and a fixed compressor case 150. A plurality of compressor vanes 154 extend radially inwardly from the compressor case 150 between stages of the compressor blades 152. The compressor blades 152 and compressor vanes 154 are arranged circumferentially about the axial compressor rotor 146 in stages (two stages of compressor blades 152 and compressor vanes 154 are shown in this example).

The axial compressor rotor 146 may be driven by the fan-turbine rotor assembly 24 either directly, or via a gearbox assembly 190, as shown. The gearbox assembly 190 shown provides a speed increase between the fan-turbine rotor assembly 24 and the axial compressor 122, at a ratio of 3.34 to 1, for example. The gearbox assembly 190 may include a planetary gearset, including a sun gear 192 coupled to the axial compressor rotor 146 and a planet carrier 194 coupled to the fan-turbine rotor assembly 24 to provide a speed differential therebetween. A plurality of planet gears 193 (one shown) are mounted to the planet carrier 194. The planet gears 193 engage the sun gear 192 and a ring gear 195. Rotating the axial compressor rotor 146 at a rate higher than that of the fan-turbine rotor assembly 24 increases the compression provided by the axial compressor 122. The gearbox assembly 190 could alternatively provide a speed decrease between the fan-turbine rotor assembly 24 and the axial compressor rotor 146.

Figure 3:
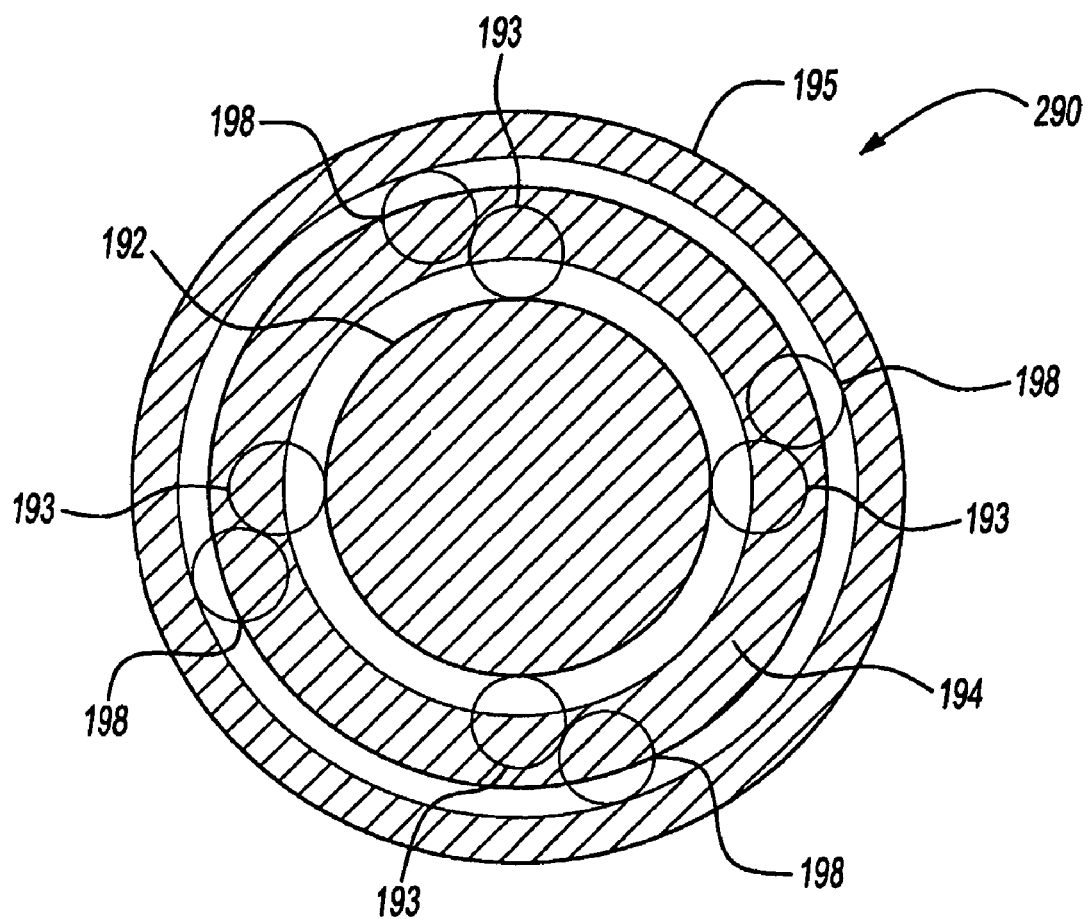
FIG. 3 schematically illustrates an alternate gearbox assembly that could be used in the tip turbine engine of FIG. 2.

An alternative gearbox assembly 290 that reverses the direction of rotation between the fan-turbine rotor assembly 24 and the axial compressor 122 is shown schematically in FIG. 3. The gearbox assembly 290 provides second planet gears 198 coupled between each planet gear 193 and the ring gear 195 and mounted to the planet carrier 194. The gearbox assembly 290 is otherwise similar to gearbox assembly 190 as described above. The gearbox assembly 290 may also provide a speed increase or a speed decrease.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising: a fan rotatable about an axis, the fan including a plurality of radially-extending fan blades, including at least one fan blade with a compressor chamber extending radially therein; and an airflow passage having an inlet downstream of the fan, the airflow passage leading to the compressor chamber in the at least one fan blade, wherein an axial compressor between the inlet and the fan is driven by rotation of the fan, at least one gear coupling the rotation of the fan to the axial compressor.

2. The turbine engine of claim 1 wherein the at least one gear changes a rate of rotation of the axial compressor relative to a rate of rotation of the fan.

3. The turbine engine of claim 2 wherein the at least one gear increases the rate of rotation of the axial compressor above the rate of rotation of the fan.

4. The turbine engine of claim 1 wherein the at least one gear reverses a direction of the rotation of the axial compressor relative to a direction of rotation of the fan.

5. The turbine engine of claim 1 wherein the airflow passage receives fan exhaust in the inlet.

6. The turbine engine of claim 5 wherein the airflow passage turns the axially rearward flowing fan exhaust radially inwardly and then axially forward.

7. The turbine engine of claim 6 further including an inducer leading from the airflow passage to the compressor chamber, the inducer turning core airflow from the airflow passage radially outward into the compressor chamber.

8. The turbine engine of claim 6, wherein an axial compressor is between the inlet and the compressor chamber.

9. The turbine engine of claim 8, wherein air flow through the axial compressor is in an axially forward direction.

10. The turbine engine of claim 1, wherein the axial compressor is aft of the fan.

11. A turbine engine comprising: a fan rotatable about an axis, the fan including a plurality of fan blades, including at least one fan blade having a compressor chamber extending radially therein to an outlet; at least one combustor proximate the outlets of the compressor chambers; at least one turbine coupled to outer ends of the fan blades aft of the at least one combustor; and an airflow passage having an inlet aft of the fan blades, the airflow passage leading to the compressor chambers in the fan blades, wherein an axial compressor is in the airfoil passage between the inlet and the compressor chambers, wherein the axial compressor is driven by rotation of the fan, wherein at least one gear increases a rate of rotation of the axial compressor above a rate of rotation of the fan.

12. The turbine engine of claim 11 wherein the axial compressor includes an axial compressor rotor having a plurality of compressor blades extending radially therefrom, the axial compressor rotor rotating in a direction opposite a direction of rotation of the fan.

13. The turbine engine of claim 11 wherein high-pressure fan exhaust from the fan enters the inlet of the airflow passage and is guided to the compressor chambers in the fan blades.

14. The turbine engine of claim 13 further including at least one inducer between the inlet and the compressor chambers, the at least one inducer turning axial flow from the airflow passage toward radial flow in the compressor chambers.

15. The turbine engine of claim 14 wherein the airflow passage turns the axially rearward flowing fan exhaust radially inwardly and then axially forward toward the at least one inducer.

16. A method of operating a turbine engine including the steps of: rotatably driving a fan having a plurality of fan blades with at least one turbine at an outer end of the fan; driving an axial compressor between an inlet of an airflow passage and the fan with the fan, wherein at least one gear couples the rotation of the fan to the axial compressor: generating fan exhaust aft of the fan via rotation of the fan; and guiding a portion of the fan exhaust radially outwardly through an interior of the fan toward the at least one turbine.

17. The method of claim 16 wherein the fan includes a compressor chamber inside at least one of the plurality of fan blades, the method further including the step of centrifugally compressing the portion of the fan exhaust in the compressor chambers of the fan blades.

18. The method of claim 16 wherein the step of guiding includes the step of turning the portion of the fan exhaust radially inwardly and then axially forward.

19. The method of claim 16, further including the step of guiding a portion of the fan exhaust through a radial compressor prior to reaching the turbine.

20. The method of claim 19, further including the step of guiding a portion of the fan exhaust through an axial compressor located at least partially aft of the fan blade.

21. The method of claim 20 wherein the fan exhaust moves through the axial compressor in an axially forward direction.

\* \* \* \* \*